Sept. 22, 1970        R. N. GOLDMAN        3,530,280

RATIFICATION SYSTEM FOR CREDIT CARDS AND THE LIKE

Filed Jan. 17, 1967        2 Sheets-Sheet 1

INVENTOR
ROBERT N. GOLDMAN

BY Nilsson, Robbins & Anderson
ATTORNEYS

United States Patent Office 3,530,280
Patented Sept. 22, 1970

3,530,280
RATIFICATION SYSTEM FOR CREDIT CARDS AND THE LIKE
Robert N. Goldman, Pacific Palisades, Calif., assignor to Telecredit, Inc., a corporation of Delaware
Filed Jan. 17, 1967, Ser. No. 609,796
Int. Cl. G05b 1/00; G06k 5/00; H04m 17/02
U.S. Cl. 235—61.7                                    4 Claims

ABSTRACT OF THE DISCLOSURE

The illustrative embodiment cooperates with credit cards containing a number. Designations for cards which have been revoked are recorded upon a magnetic tape and are compared with the designation that is sensed from a card. In the event of coincidence, the card is indicated to have been revoked. Card designations carried on the tape are arranged in accordance with a predetermined numerical sequence. Structures detect when the tape loop has passed the designation of the card under consideration. To further reduce time, the card designations are broken down and carried on several parallel channels of the tape. Each of the channels contains certain digits of the numerical card designations while other digits are employed to address the proper channel.

BACKGROUND OF THE INVENTION

Credit cards, charge plates and similar devices have come into widespread use to designate the bearer-owner as a person to whom credit or other courtesy may be extended. These devices have been successful largely because they enable the owner-bearer to avoid carrying significant amounts of cash. However, the widespread use of these devices has not been without certain difficulties. For example, the bearer-owner of a credit card may become irresponsible due to financial reverses or the card may be lost or stolen. In such situations, frequently either the bearer-owner of the card or the honoring organization incurs a substantial loss.

In many instances, as when credit cards are lost or stolen, the honoring organization is aware that the card should be revoked, i.e. no longer honored; however, the effective communication of that knowledge to all facilities involved presents a problem of prodigious dimensions. For example, the central office of an oil company may possess the knowledge that a particular credit card has been stolen or lost; however, effectively providing that knowledge to all service stations honoring the card, and all personnel who may receive the card, is economically almost impossible.

SUMMARY

In considering the problem of providing a mechanized system operable to ratify or reject credit cards or the like, it was proposed to assign individual cards a numerical designation which would be carried on the card by a recording medium. The numerical designations of stolen cards or other cards that are to be rejected for various other reasons could then be carried in a memory structure for comparison with designations from each card presented for credit.

A major problem in such a structure involves maintaining reasonable economy while providing adequate operating speed. For example, various high-speed memory structures might be employed; however, these units are generally expensive to manufacture and operate. Alternatively, a simple structure affording a serial presentation of the rejected numbers tends to be too slow with the attendant danger of offending credit-card bearer-owners.

As significant additional improvements to the basic concept, the system hereof affords a unit that is economical to manufacture, which operates rapidly, and in which it is economical and simple to maintain current information on revoked cards. Specifically, the system incorporates a serial memory including several parallel channels for providing rejected credit-card numerical designations. A portion of each of the designations is recorded in sequence in the channels, while the other portion of the designations address the proper channel. As a result, the scanning interval is reduced to afford a shorter interval of operation.

The system hereof also accomplishes a reduction in time of operation by incorporating structure whereby searching is immediately initiated. That is, the system does not await a starting point in the tape loop (or other record) before starting to search. Rather the record is scan searched substantially immediately (after no more than one data word) on receipt of an inquiry.

The interval of operation is shortened still further by arranging the rejected numbers in accordance with a predetermined sequence and incorporating structure for detecting the instant when the location for the numerical designation of concern has been passed. As a result, a proper credit card is normally ratified long before the complete memory has been scanned. Thus, various objects of a practical, economical and rapid system are provided, which system may be effectively used at cashier stations for reducing credit card losses.

BRIEF DESCRIPTION OF THE DRAWING

The drawing, disclosing an illustrative embodiment of the present invention to represent the various objects and advantageous hereof sets forth as follows.

DETAILED DESCRIPTION OF THE ILLUSTRATIVE EMBODIMENT

Figure 1:
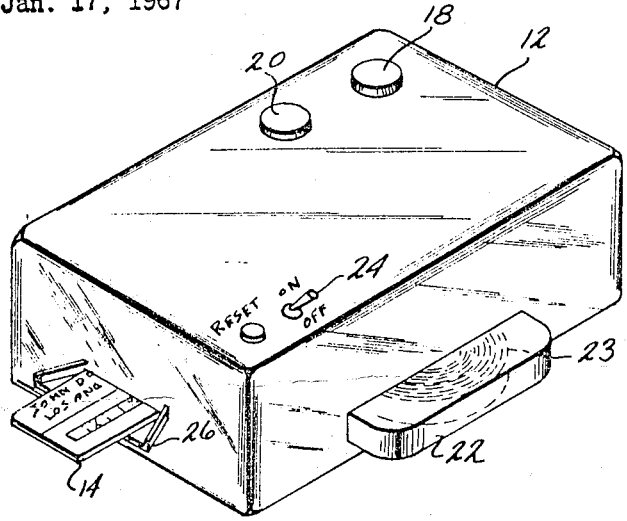
FIG. 1 is a perspective view of a physical unit including the system and principles of the present invention.
Figure 2:
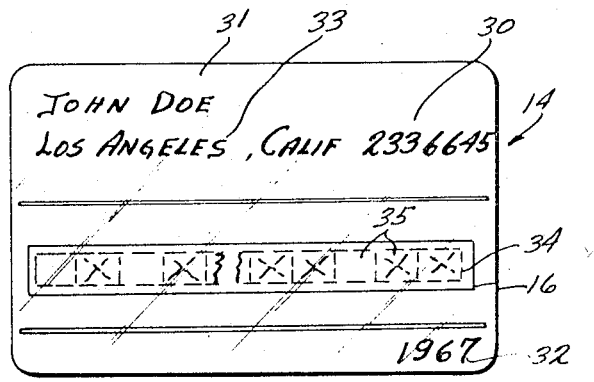
FIG. 2 is a plan view of an identification card suitable for use in cooperation with the unit of FIG. 1.

Referring initially to FIG. 1, a unit 12 embodying the present invention is shown receiving a cooperating identification card 14 which is to be verified. Of course, the card 14 (in standard multiplicity) may take a wide variety of different forms, including for example tabs and keys, as well as plates formed of either plastic or metal; however, it is significant that the card 14 or other device embody recording capability, provides a record, e.g. punched card, embossed card, or may carry a recording medium which, in the illustrative example, comprises a fine layer of magnetizable particles suitable for magnetic recording. As indicated in FIG. 2, the recording medium is provided by a layer 16; however, the medium might alternatively comprise a uniform layer disposed over the entire reverse surface of the card, a layer in sandwich structure or virtually any other arrangement of recording medium.

The card 14 also carries certain identification (either characteristic or arbitrary) designating the bearer-owner and additionally has a numerical designation which may be printed or embossed on the card and is recorded upon the recording medium as well. In general, the operation of the system as shown in FIG. 1 involves placing the card 14 into the unit 12 so that the numerical designation recorded on the card 14 is sensed for comparison with the numerical designations of cards that have been invalidated, or revoked carried in a memory. If the inserted card is found to be revoked a "red" light 18 is illuminated. If the card is valid, it is indicated to be affirmed by a "green" light 20. The entire operation of verifying a card involves only a matter of seconds and affords a definite indication to the person in charge of the transaction, that is either positive or negative.

The numerical designations for invalid or revoked cards are carried on a memory within the unit 12, specifically comprising a cartridge 22 including an endless loop of magnetic tape 23, from which designations are sensed as well-known in the prior art. Therefore, in operation, the unit may be located at the actual point of sale. Then, periodically a fresh tape cartridge 22 is inserted which contains a current record of invalid and revoked credit-card designations.

The unit is placed in operation by means of a simple switch 24 and may be readily embodied in a model that is in a continuously operative state during business hours. Upon presentation of a credit card, the sales person simply inserts the card 14 into the unit 12 through an entry 26, retrieving the card, as it passes out of the unit 12 on the other side. Almost immediately one of the lights 18 or 20 is energized to afford either a "red" signal (negative) or a "green" signal (positive) indicating the current status of the card. Thereafter, the sales person may depress a reset button 28 to clear the unit and de-energize the illuminated lamp 18 or 20, or insert another credit card to clear the unit.

As indicated above, the identification device or card may take any of a wide variety of different forms and the card 14 (FIG. 2) is merely illustrative. However, in the disclosed embodiment, the card 14 comprises a plastic material carrying a strip layer 16 of magnetic recording medium, e.g. fine iron oxide particles, applied to one surface. The upper portion of the card 14 is embossed to identify the owner by name, address, and account number. Specifically, the account number 30, the name 31, and the city 33 all comprise embossed letters formed in the card 14. Additionally, the card may include numbers 32 designating the date, related as for example to the period during which the card is authorized for use.

The numerical designation recorded on the layer 16 is not humanly perceivable and if desired, the entire strip can be concealed by placement between laminations of the card or cover one entire surface. The layer 16 is shown to include (in phantom) a pure binary recording channel 34 in which a numerical designated coincident with the number 30 is recorded. The channel 34 may comprise a different number of digits; however, in the illustrative system as described in detail below, provision is made for 24 binary bits which are recorded in a serial format. Of course, the actual binary code employed, and the recording techniques for the representative signals may vary within limits, and in this regard it is noteworthy that the art of data recording is quite advanced and many suitable techniques have been developed. Of course, other data may also be recorded upon the layer 16 in accordance with other developments.

Considering the illustrative example in greater detail, the significance of the twenty-four sequential binary storage locations 35 afforded along the length of the card on the layer 16 are indicated in a chart below. In general the code should be of an increasing or decreasing nature, with a single-direction change for each incremental change. By using a straight binary code, more compact structure also permits using a shorter tape loop.

CHART I

| Sequential order | Designation | Function |
| --- | --- | --- |
| 1 | N24 | Numerical designations. |
| 2 | N23 | Do. |
| 3 | N22 | Do. |
| 4 | N21 | Do. |
| 5 | N20 | Do. |
| 6 | N19 | Do. |
| 7 | N18 | Do. |
| 8 | N17 | Do. |
| 9 | N16 | Do. |
| 10 | N15 | Do. |
| 11 | N14 | Do. |
| 12 | N13 | Do. |
| 13 | N12 | Do. |
| 14 | N11 | Do. |
| 15 | N10 | Do. |
| 16 | N9 | Do. |
| 17 | N8 | Do. |
| 18 | N7 | Do. |
| 19 | N6 | Do. |
| 20 | N5 | Do. |
| 21 | N4 | Do. |
| 22 | N3 | Channel address. |
| 23 | N2 | Do. |
| 24 | N1 | Do. |

It is to be noted that in placing the card 14 into the unit 12, these bits are sensed in order. However, the bit designated N24 is sensed first from the card 14 while the bit N1 is sensed last. The bits N1, N2 and N3 cooperatively specify one of eight channels recorded on the magnetic tape loop 23 (FIG. 1) each of which contains numerical designations in code words of only twenty-one bits, i.e. bits N4 through N24. The format by which the bits N1, N2, and N3 designate a particular channel is indicated in the following chart:

CHART II

| N1 | N2 | N3 | Channel |
| --- | --- | --- | --- |
| 0 | 0 | 0 | C1 |
| 1 | 0 | 0 | C2 |
| 0 | 1 | 0 | C3 |
| 1 | 1 | 0 | C4 |
| 0 | 0 | 1 | C5 |
| 1 | 0 | 1 | C6 |
| 0 | 1 | 1 | C7 |
| 1 | 1 | 1 | C8 |

That is, depending upon the combination of the digits N1, N2, and N3 one channel is specified from which the numerical designations are sensed in predetermined order, e.g. numerical order, for comparison with the remaining digits of the numerical designation under consideration from the credit card. Recapitulating, the three digits N1, N2 and N3 of the credit card numerical designation designate a particular channel from which sequences of the remaining digits are sensed in search of identity.

Of course, the number of digits employed may vary in accordance with the particular embodiment and the application, however, in the illustrative embodiment, the numerical designations recorded sequentially in each of the channels of the magnetic tape include twenty-one binary digits. These twenty-one binary digits in conjunction with the three binary digits employed to select a tape channel afford twenty-four binary digits by which seven-digit decimal values can be provided to accommodate a large range of numerical designations for cards.

Figure 4:
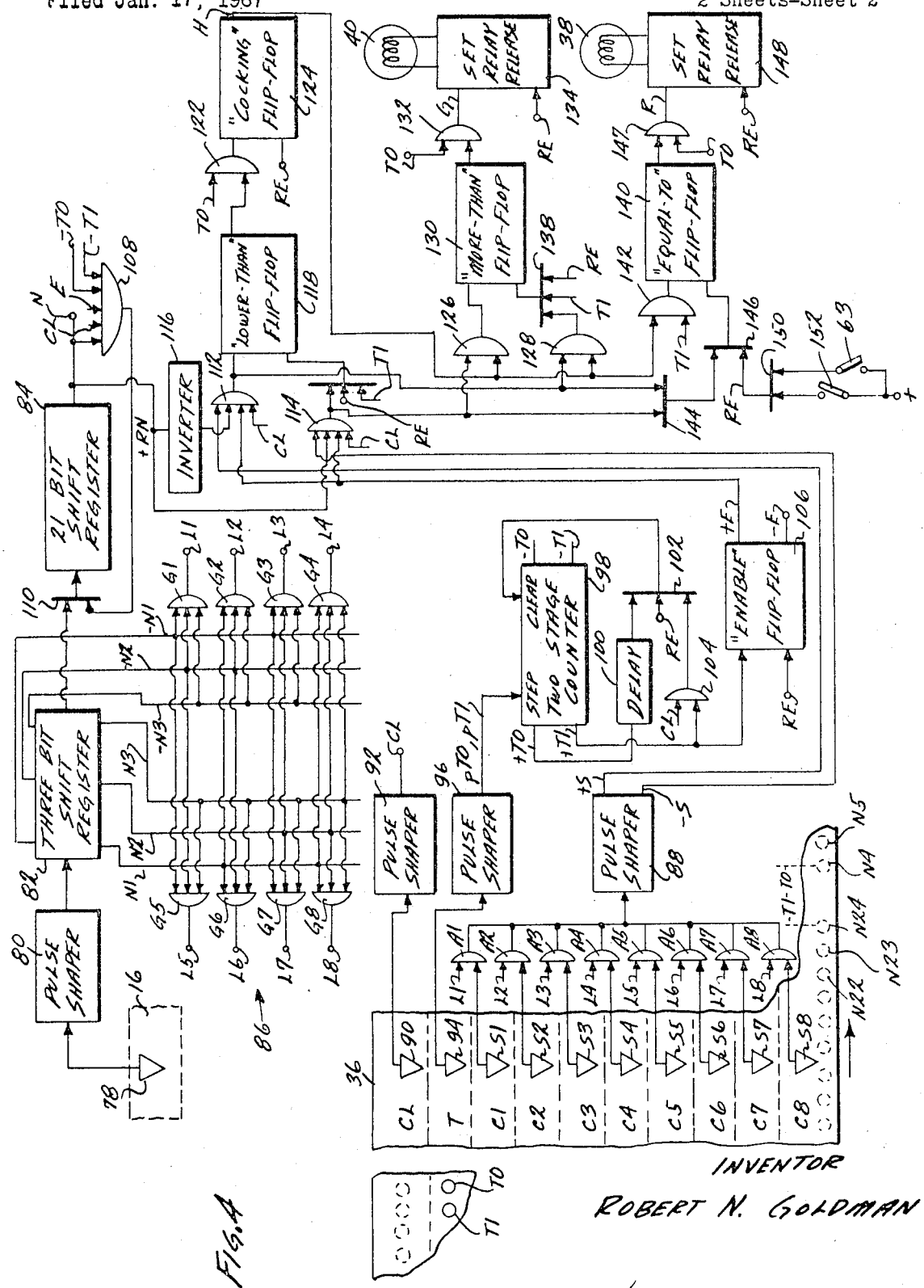
FIG. 4 is a diagrammatic representation of the electrical and logic organization of the system of FIG. 1.

Considering the system in somewhat greater detail, reference will now be had to FIG. 4 in which the layer 16 of the recording medium carried upon the card 14 is indicated in the upper-left hand corner. The magnetic recording tape 36 is fragmentarily represented greatly enlarged immediately below to include ten separate channels; specifically a clock channel CL, a timing channel T, and numerical-designation channels C1 through C8. The clock channel CL marks the binary bit recording locations on the tape 36. The timing channel T carries two markers for each record for the generation of timing signals $P^{T0}$ and $P^{T1}$, which define the spaces between the numerical-designation words of twenty-one bit length. The channels C1 through C8 then each include a series of twenty-one bit code words indicative of the cancelled numerical designations which are pre-arranged in numerical sequence. Of course, a wide variety of different sequences may be employed; however, as proposed herein the sequences comprise a conventional binary code order representative of decimal card numbers.

The individual twenty-one bit numerical designations or values carried in each channel of the magnetic tape are numerically arranged. That is, analyzing the greatly enlarged tape 36 an arbitrary starting place on the tape is designated by two timing signals $P^{T0}$, $P^{T1}$ in the channel T (FIG. 4) followed by twenty-one "zero" bits in each of the data channels. Those numerical designations are immediately followed by the timing signals $P^{T0}$ and $P^{T1}$ (in the channel T) coincident with voids in the channels C1–C7. The next numerical value in each channel would then be the lowest numerical value on the negative-number list of the channel, from digits N24 to N4. Thus, the negative (revoked or cancelled) values are numerically arranged, each including twenty-one binary bits and separated by two spaces occupied by timing bits $P^{T1}$ and $P^{T0}$ (from a separate channel). The record is then terminated by twenty-one "one" bits in each data channel. The sequential format of the numerical value is set forth in the following chart:

CHART III

| First Number | 0 0 0 0 0 0 0 0 0 0 0 0 0 0 0 0 0 0 0 0 0 |
|---|---|
| | (Numerically arranged) |
| Last Number | 1 1 1 1 1 1 1 1 1 1 1 1 1 1 1 1 1 1 1 1 1 |

In the operation of the system, the individual binary bits would be sensed or scanned from the tape channel in the same sequence as though Chart III were scanned in a raster pattern i.e. left to right, top to bottom.

It is to be noted, that the magnetic tapes will normally be prepared by a general-purpose computer or similar unit, which can readily arrange these numerical designations in the prearranged numerical sequence. Such a cyclic arrangement simplifies the system hereof as well as increasing the average speed of operation to obtain a manifestation of whether or not the card is on the negative list.

As outlined, the general operation of this system is to sense the card's numerical designation from the layer 16, then to determine whether or not that numerical designation is stored on the tape 36. If the designation is so stored, the card identified is indicated to be revoked by the illumination of a red light bulb 38 (lower right). However, if the card has not been revoked a green light bulb 40 is energized. Also as indicated above, the system is simplified and the capacity thereof is increased by employing binary codes to represent the recorded values. Furthermore, in this regard, the serial nature of the system accomplishes further simplification and the distribution of the numbers or numerical designations into a plurality of channels reduces the time required to scan the tape.

Figure 3:
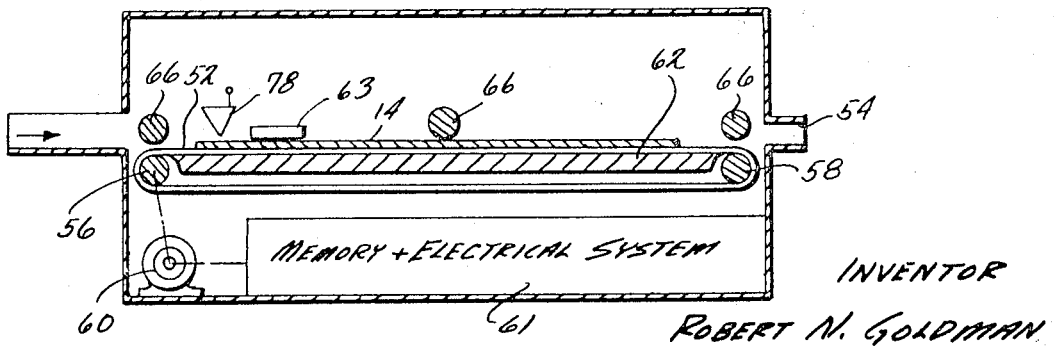
FIG. 3 is a diagrammatic and vertical sectional view taken through the structure of FIG. 1.

The initial phase of the operation involves sensing the numerical designation of a card 14. This operation is accomplished upon inserting the card 14 into the entry 26 (FIG. 1) from which it is received upon a rotary belt 52 (FIG. 3) for movement through the unit and out through an exit port 54. The belt 52 may comprise any of a variety of endless flexible forms and is held extended between a drive roller 56 and an idler roller 58, fixed at the opposite ends of the units. The drive roller 56 is mechanically coupled to be revolved by a motor 60 which moves the belt 52 at a substantially constant speed, e.g. five inches per second across a back-support table 62. The drive motor 60 is also mechanically connected to the electrical system 61 and serves to operate the tape cartridge 22 driving the tape past magnetic sensing heads as described below. In this regard, the tape may be moved at various speeds; however, seven and one-half inches per second has been found desirable with a recording density of 140 bits per inch.

It is to be-noted, that the motor 60 is energized by a switch 24 (FIG. 1) and may remain operative continuously so that no warm-up time is required and a relatively inexpensive motor may be employed. As the card is carried across the table 62 (FIG. 3) it is held down by the rollers 66 mounted above the belt 52, to actuate a "go" switch 63 and to be magnetically sensed. In moving through the unit 12, the card passes under a magnetic sensing head 78, which develops electrical signals in accordance with the magnetic record. Those signals are, as previously indicated, in binary form and comprise a sequence of twenty-four binary bits which are passed from the head 78 to a pulse shaper 80 (FIG. 4). Various forms of circuits satisfactory for use as the pulse shaper 80 are well known in the prior art and may include an amplifier stage as well as a binary circuit. The output from the pulse shaper 80 may be in the form of discrete binary signals and is applied to a three-bit shift register 82 which is in turn linked to a twenty-one bit shift register 84. Shift registers are well known in the prior art and function to receive and store binary signals within their binary stages. Thus, when the magnetic layer 16 has been sensed, the twenty-four bits therefrom are registered in order by the shift registers 82 and 84. In this regard, it is to be noted that the bits N1, N2 and N3 are contained in the register 82. These bits designate a particular one of the channels C1 through C8 on the tape 36 in accordance with Chart III thereby accounting for three binary bits in the numerical designation. The remaining bits of the numerical designation are sensed as individual code words from the selected channel for comparison with the content of the shift register 84.

If a coincidence is detected during comparison, the revocation of the subject credit card is manifest by the red bulb 38. However, if no coincidence is detected, the green bulb 40 is illuminated. It is to be noted, that these manifestations are normally accomplished in the system hereof without the contents of the register 84 being compared with each and every code word in a particular channel of the tape 36. That is the time for the operation of the system hereof is reduced first by selecting one of several channels on the basis of certain digits of the numerical designation and secondly by incorporating structure for determining on a logical basis the absence of a numerical designation on the negative list prior to comparing all recorded values. Specifically, the designations in each of the channels C1 through C8 are numerically arranged, then logic structure is provided to determine that the location for the numerical designation under consideration has been passed and that the designation was not in that location. As a result, the average search time for a numerical designation (which is not recorded) is substantially cut in half.

The bits N1, N2, and N3 (contained in the shift register 82) identify one of the channels C1 through C8. Selection is accomplished by a decoding generating an associatively-identified signal L1 through L8. That is, one of the binary signals L1 through L8 is exclusively high for each of the possible combinations of the signals N1, N2 and N3 as shown by Chart II above. The occurrence of a particular signal L1 through L8 being high selects a respective channel C1 through C8 to be read.

Considering the decoding network 86 in greater detail, the manifestations of the binary bits N1, N2 and N3 are provided in the form of similarly-identified binary signals N1, N2 and N3 and the negations thereof —N1, —N2, and —N3 taken from the register 82. These signals are applied to qualify one of eight "and" gates G1 through G8 as well known in the prior art in accordance with the logic set forth in Chart II. For example, the gate G1 is connected to receive the signals +N1, +N2, and +N3 and upon the occurrence of each of these signals being true (high) the gate is qualified and develops the binary signal L1 in a high state. The remaining gates G2 through G8 function in a similar manner to exclusively provide one of the high signals L2 through L8 high for a pre-established logical combination of the signals +N1, +N2, +N3 and their negation signals —N1, —N2 and —N3.

The signals L1 through L8 are applied to "and" gates A1 through A8 respectively; however, in the interest of preserving the legibility of the drawing, these connections are not shown in FIG. 4. In accordance with the standard operation of well known "and" gates, one of the "and" gates A1 through A8 is exclusively qualified to pass a signal upon receiving an associated signal L1 through L8 high.

The "and" gates A1 through A8 are also connected to receive signals sensed from the channels C1 through C8 respectively. Therefore, upon occurrence of one of the signals L1 through L8 being high, the respectively-identified channel C1 through C8 is selected with the result that binary signals therefrom are sensed by one of the heads S1 through S8 respectively for application through a selected one of the gates A1 through A8 to a pulse shaper 88. Pulse shapers of this type are well known in the prior art; however, it is to be noted that a single shaper 88 receives the selected channel output avoiding the need for eight different pulse shapers.

The output from the pulse shaper 88 comprises a sequential or serial presentation of the binary digits in turn defining code words from the selected channel. Such a signal is generally designated as signal +S, and the negation of that signal is designated as signal —S. These signals manifest twenty-one bit code words spaced apart by two bits during the period of the timing signals $P^{T0}$ and $P^{T1}$. The clock pulses C1 derived from the tape channel C1 are sensed by a head 90 to develop pulses for application to a pulse shaper 92 which provides the clock pulses C1. In a somewhat similar fashion, a head 94 senses the channel T of the tape 36 to provide signals to a pulse shaper 96 which in turn develops the timing signals $P^{T0}$ and $P^{T1}$.

The clock pulses C1 are applied to various gates within the system to time the operator thereof, and in this regard, to simplify the drawing, all such connections are not shown. The timing pulses $P^{T0}$ and $P^{T1}$ are applied from the shaper 96 to a two-stage counter 98 which serves to develop the negation signals —T0 and —T1 as well as the true signals +T0 and +T1. Specifically, the counter 98 provides a signal +T0 high upon receipt of the signal $P^{T0}$ from the pulse shaper 96. In operation, the system must start its sequence by sensing both the signals $P^{T0}$ and $P^{T1}$. If it is activated between these signals, the first signal $P^{T1}$ is sensed as $P^{T0}$ which is faulty, therefore pending the conclusion of the next word and the next timing signals, the counter 98 is reset by the signal +T0 through a delay circuit 100 and an "or" gate 102. If the timing signals are both sensed (as would usually occur) signal +T0 is properly formed. Then, the signal $P^{T1}$ advances the counter 98 to manifest the signal +T1 high and the signal +T0 low. Of course, the counter 98 also accomplishes the compatible negation signals —T0 and —T1. Upon the occurrence of the first clock pulse C1 after the signal +T1, the counter 98 is cleared through an "and" gate 104 and a connection gate 102. That is, the signal +T1 along with the clock pulse CL qualifies the "and" gate 104 to clear or reset the counter 98.

The signal +T1 is also applied to an "enable" flipflop 106 setting that circuit to provide a signal +E high and the negation thereof, signal —E low. Flipflop circuits are very well known in the prior art and any of a wide variety thereof may be effectively employed to function as the flipflop 106.

The signal +E from the flipflop 106 manifests the initiation of a period for comparing the contents of the register 84 sequentially with the numerical code words from one of the selected channels C1 through C8. As suggested, that period is initiated by the timing signals T0 and T1 so as to start at the beginning of a binary word from the tape 36. Thereafter, the bits contained in the shift register 84 are stepped in a cyclic fashion to be recirculated through the register and compared with numerical designations or code words sequentially taken from the selected channel on the tape 36. Specifically, the cyclic stepping of binary signals around the register 84 is accomplished through an "and" gate 108. The gate 108 is connected to receive: the output from the register 84, the clocking pulses C1, the qualifying signal +E and the negation signals —T0 and —T1. Thus, the content of the shift register 84 is presented in a serial form in synchronism with binary words from the selected channel on the tape 36. The binary signals RN from the register 84 (representing the numerical designation of present concern) are returned to the shift register 84 through an "or" gate 110 providing an isolated connection.

The signals +RN from the shift register 84 are also applied to a pair of "and" gates 112 and 114 to accomplish the desired comparison. Specifically, the signals RN are applied directly to the gate 114 and through an inverter 116 to the gate 112. The gates 112 and 114 also receive the signal +E which designates the period of operative comparison. Additionally, the "and" gates 112 and 114 receive the signals +S and —S respectively which manifest the actual binary digits from the pulse shaper 88 taken from the selected channel of the tape 36. Recapitulating, the signal +S comprises the binary bits which define numerical code words that are recorded in one of the channels on the tape 36 while the signal —S represents the negation of such binary bits. The signal +S is applied to the gate 112 along with the negation signal —RN representative of the binary bits contained in the shift register 84. These digits are applied in the timed sequence of the clock pulses CL, from least-significant to most-significant digit. A signal is then passed by the gate circuit 112 during each stage when the signal +S is "one" and the signal +RN from the register 84 indicates zero (—RN is high).

In a somewhat inverse manner, the gate 114 receives the inverse signals —S along with the true signals +RN from the register 84. Therefore, each time the signal +RN is a "one" and the signal +S from the tape is a "zero" (—S is a "one") the gate 114 is qualified and passes a high signal.

The output from the gate 112 is connected to set a flipflop 118 while the output from the gate 114 is connected to reset that flipflop. Although the flipflop 118 may be set and reset many times during a binary word comparison, it will be in a set state at time T0 only if the preceding numerical representation from the register 84 is lower in value than the numerical representation from the tape 36.

Considering the comparison in greater detail, it may be resolved finally into three possibilities: (1) the signals +RN from the register 84 indicate a numerical value identical with the signal +S from the tape 36; (2) the signals +RN from the register 84 indicate a numerical designation of lower value than the signal +S from the tape 36; or (3) the signals +RN from the register 84 indicate a numerical designation of higher value than the signals +S from the tape 36. In the operation of this system, if the signals indicate similar values, the numerical designation under consideration is indicated to have been revoked and the red bulb 38 is energized. Alternatively, if the signals +RN from the register 84 manifest a value lower than the signal +S just sensed from the tape 36, the location for the subject number has been passed in the numerical sequence of the cyclic tape. Therefore, the next binary word from the tape must also be compared with the contents of the register 84. The comparisons thus continue until the order is proper, that is, the contents (signal +RN) of the shift register 84 is more than the value from the tape (signal +S). Thereupon the cocking flipflop 124 is set, manifesting that the sequence is proper to sense that the location for the number in question is being approached according to the incremental sequence. After the flipflop 124 has been set, should the comparison indicate that the contents of the shift register 84 to be a higher value than the code word sensed from the tape 36 (no coincidence having been detected), the green bulb 40 is immediately illuminated to indicate a valid numerical designation on the basis that the location in which the numerical designation of concern would have been located (if present) has been passed and that the numerical designation was not registered in such location. Thus, in summary, the system first establishes that the number in question is being approached according to the selected direction of incrementing, then if the location for that number is passed without detecting coincidence, absence of the number is manifest.

In the system, a numerical sequence is employed and the locations of values in that sequence are critical. The numerical order or sequence employed in the illustrative embodiment consists of a straight or pure binary code; however, it will be readily apparent to those skilled in the art that other pre-arranged positional-significant pattern codes may be established in an embodiment of the system hereof, in which case such terms as "lower than" or "higher than" simply designate the position in the sequence with respect to a particular numerical designation. Generally, the codes must involve a single-directional change to increment.

As indicated above, the occurrence of a numerical designation in the register 84 (signals +R) that is lower than the numerical designation sensed from the tape 36 (signals +S) causes the flipflop 118 to be set. A high output from the flipflop 118 qualifies an "and" gate 122 which passes the next-following timing signal T0 to set a "cocking" flipflop 124. The set-state output from the flipflop 124 is termed signal H and is high when the flipflop 124 is set, indicating that at least one comparison has been made, during the current series, when the value in the register 84 was less than the value sensed from the tape 36. Of course, this situation must prevail before it can be determined that the location for value in the shift register 84 has been passed. The signal H, going high to indicate the tape 36 has reached a position at which lower numerical values are being provided than the numerical value contained in the register 84, is applied to a pair of "and" gates 126 and 128. The gate 126 also receives the signal from the gate 114 while the gate 128 receives the signal from the gate 112.

Recapitulating, depending upon which of the gates 112 or 114 is last to pass a pulse, the relative magnitudes of the numerical values undergoing comparison is manifest. If the gate 114 is last to pass a signal then the gate 126 was last to be qualified a flipflop 130 is set. However, if the gate 112 was last to be qualified, the gate 128 acts last to reset the flipflop 130. When set, during signal T0, the flipflop 130 provides an output through an "and" gate 132 in the form of a signal G which sets a relay 134. The relay 134 may comprise a polar relay and is set by the signal G to energize the green lamp 40, until the occurrence of a reset signal RE which disengages the relay and de-energizes the lamp 40. Thus, when the location for the numerical value that is contained in the register 84 has been passed on the tape 36 and was not present, the flipflop 130 is set to develop the signal G which, in turn energizes the green lamp 40. The flipflop 130 is reset either by the timing signal T1 or the reset signal applied through a connection gate 138.

If the contents of the register 84 and the numerical value sensed from the tape 36 are identical, a flipflop 140 is set at the conclusion of a comparative cycle. That is, the flipflop 140 is set through an "and" gate 142 after the signal H becomes high to designate the proper relationship, and at the first comparison thereafter manifest by the signal T1. Thereafter unless the flipflop 140 is reset by a variance, coincidence has occurred. More specifically the flipflop 140 is reset upon detection of any difference between the two numbers undergoing comparison. Such a difference qualifies either the gate 114 or the gate 116. The variation then results in a signal which is applied through a connection gate 144 and a connection gate 146 to reset the flipflop 140. If the flipflop 140 is not reset, in this manner, the high signal therefrom, manifesting the set state qualifies an "and" gate 147 during the timing pulse T0 to develop the signal R high which sets a relay 148 to energize the red bulb 38. In this manner, the numerical designation of concern is indicated to be carried on the revoked list. The relay 148 may be similar to the structure of the relay 134 which is also reset by the reset signal RE.

The reset signal RE also resets the flipflops 118, 130, 140 and 124. This signal RE is developed through an "or" gate 150 (lower right) which may be provided with an input either through a manually-operated switch 152 or from the card actuated switch 63. Thus, after the system has functioned to determine whether the numerical designation indicating a particular card is valid or revoked, and properly manifest by either the "green" lamp 40 or the "red" lamp 38, the lamps may be immediately de-energized by closure of the switch 152 (controlled by the button 21 FIG. 1) or automatically upon insertion of the next card.

Reviewing the operation of the entire system the tape 36 carries eight distinct sets of arranged numerical designations, which are provided and arranged, for example by a general-purpose digital computer. The tape 36 is a continuous loop and is continuously scanned in a cyclic fashion by the sensing heads provided. Upon inserting a credit card into the unit, the first three binary digits representing the numerical designation of the card are sensed to select one of the eight channels on the tape 36 affording digital significance to those channels. Thereafter, the selected channel is scanned providing a series of signals in word groups, for comparison with the numerical designation in question. If a coincidence occurs then the numerical designation is known to represent a revoked card and accordingly the red lamp is illuminated. On the contrary if the numerical designation in question is not found and the location in which it would have been registered is passed, a positive indication is provided by the illumination of the green light. As a result, the system affords a prompt response to the insertion of a credit card in question. As indicated above the speed of operation is accomplished by the manner of organizing the tape 36 in cooperation with the basic logic of the system and as a result of the feature which enables detection of the absence of a numerical designation without the necessity in each instance of scanning the entire tape or delaying the search operation pending a start position on the record. That is, the search operation is initiated immediately without waiting for a "start" time or position. It is readily apparent that the present invention may be variously embodied for purposes of identification, verification, credit card ratification, and so on. For example, the system might be employed to periodically ratify or revalidate issued credit cards. Alternatively, the system might check a card each time it is presented. In the usual adaptation, cards or the like which are not ratified will be claimed and either destroyed or returned to the issuing agency.

As suggested above, the various applications for different embodiments of this system are large in number and it is readily apparent that the criterion for the signals registered in this system may vary widely over different periods of time and for different purposes. As a result, it is to be appreciated that the system hereof is not to be limited in accordance with the specific illustrative examples set forth herein; rather the scope of the present invention is to be determined in accordance with the claims set forth below and forming a part hereof.

What is claimed is:

1. A system for checking identification cards or the like, having a numerical designation, which cards include a recording medium carrying said numerical designation, said system comprising:

sensing means for sensing said recording medium to provide electrical signals representative of said numerical designation for a card;

register means connected to receive said electrical signals representative of said numerical designation, for containing such electrical signals as first and second signals representative of first and second portions of said numerical designation;

a serial memory means for presenting electrical signals representative of numerical designations of said cards or the like, which are unacceptable, said serial memory including means to provide said electrical signals representative of numerical designations in a predetermined order of significance, said serial memory means third including a plurality of record channels, each for providing electrical signals representative of said second portion of said numerical designation;

channel selection means, connected to be controlled by said first signals contained in said register means for supplying electrical signals from said selected channels of said serial memory representative of a second portion of said numerical designation;

comparison means for comparing said electrical signals from said serial memory means representative of said second portion of said numerical designation with said electrical signals representative of a similar portion of said numerical designation from said register means, said comparison means including means for determining that electrical signals from said serial memory means are of a significance in said predetermined order beyond said electrical signals representative of said numerical designation;

means for manifesting the occurrence of coincidence detected by said comparison means to indicate an unacceptable card designation; and means for manifesting that a card or the like is not unacceptable, operating under the control of said comparison means and said means for detecting.

2. A system according to claim 1 wherein said serial memory means comprises a closed path of magnetic medium, upon which are defined a plurality of recording channels; plural sensing means for sensing each of said recording channels to provide electrical signals.

3. A system according to claim 1 wherein said serial memory means comprises a closed path of magnetic medium upon which are defined a plurality of recording channels; plural sensing means for sensing each of said recording channels to provide electrical signals.

4. A system according to claim 1 wherein said means for manifesting includes first means for providing an unacceptable indication for a card numerical designation, indicating said designation is carried in said serial memory means, and second means for providing a positive indication for a card numerical designation, indicating said designation is not carried in said serial memory means, said first means being connected to be controlled by said comparison means and said second means being connected to be controlled by said means for detecting.

References Cited

UNITED STATES PATENTS

| | | |
|---|---|---|
| 2,157,860 | 5/1939 | Nelson. |
| 3,039,582 | 6/1962 | Simjian. |
| 3,167,646 | 1/1965 | Giroux. |
| 3,184,714 | 5/1965 | Brown et al. |
| 3,221,306 | 11/1965 | Hayes _____ 340—172.5 |
| 3,404,259 | 10/1968 | Atkinson et al. |

MAYNARD R. WILBUR, Primary Examiner

T. J. SLOYAN, Assistant Examiner

U.S. Cl. X.R.

179—6.3; 340—149